(12) United States Patent
Pauritsch et al.

(10) Patent No.: US 7,884,654 B2
(45) Date of Patent: Feb. 8, 2011

(54) CIRCUIT ARRANGEMENT AND METHOD FOR CONTROLLING AN ELECTRICAL LOAD

(75) Inventors: Manfred Pauritsch, Graz (AT); Peter Trattler, Graz (AT)

(73) Assignee: Austriamicrosystems AG, Unterpremstatten (AT)

( * ) Notice: Subject to any disclaimer, the term of this patent is extended or adjusted under 35 U.S.C. 154(b) by 157 days.

(21) Appl. No.: 12/087,818

(22) PCT Filed: Jan. 12, 2007

(86) PCT No.: PCT/EP2007/000261

§ 371 (c)(1),
(2), (4) Date: Feb. 11, 2009

(87) PCT Pub. No.: WO2007/082692

PCT Pub. Date: Jul. 26, 2007

(65) Prior Publication Data

US 2009/0243510 A1    Oct. 1, 2009

(30) Foreign Application Priority Data

Jan. 13, 2006   (DE) .................. 10 2006 001 868

(51) Int. Cl.
*H03L 7/06* (2006.01)
*H03D 3/24* (2006.01)

(52) U.S. Cl. ............ 327/147; 327/145; 327/143; 327/156; 327/155; 375/376; 375/375; 375/373; 375/354

(58) Field of Classification Search ........... 327/147, 327/145, 143, 156, 155, 154, 146, 144, 141, 327/334, 39, 42, 44, 45; 375/376, 375, 373, 375/353, 354, 334, 261, 327, 215; 340/310.01, 340/310.02, 538, 538.11
See application file for complete search history.

(56) References Cited

U.S. PATENT DOCUMENTS

| 5,479,159 | A | 12/1995 | Kelly et al. | |
| 6,710,635 | B1 * | 3/2004 | Wilson | 327/156 |
| 6,989,257 | B2 * | 1/2006 | Berry et al. | 435/189 |
| 2003/0043027 | A1 | 3/2003 | Carson et al. | |

FOREIGN PATENT DOCUMENTS

| AT | 387 479 | 1/1989 |
| DE | 1 638 969 | 11/1970 |
| DE | 3320397 A1 | 12/1984 |
| DE | 3425782 A1 | 2/1985 |

(Continued)

*Primary Examiner*—Tuyet Thi Vo
(74) *Attorney, Agent, or Firm*—Cohen Pontani Lieberman & Pavane LLP

(57) ABSTRACT

A circuit arrangement (10) for driving an electrical load (2) comprises an input (11) for feeding a power-supply voltage (Vs) with an AC component and an output (13) for providing an output signal (Sout) for driving a connectable electrical load (2). The circuit arrangement (10) further comprises a frequency processing circuit (20) for proving a reference frequency (f1) as a function of the AC component, and a demodulator (60) with a first input (61) for feeding the reference frequency (f1), with a second input (62) that is coupled to the input (11) of the circuit arrangement (10), and with an output (63) that is coupled to the output (13) of the circuit arrangement (10).

25 Claims, 5 Drawing Sheets

FOREIGN PATENT DOCUMENTS

| | | |
|---|---|---|
| DE | 4232618 A1 | 3/1994 |
| DE | 19637151 C1 | 10/1998 |
| DE | 102004030883 A1 | 1/2006 |
| EP | 1555859 A1 | 7/2005 |
| FR | 2 101 287 | 3/1972 |
| GB | 1 145 679 | 3/1969 |

\* cited by examiner

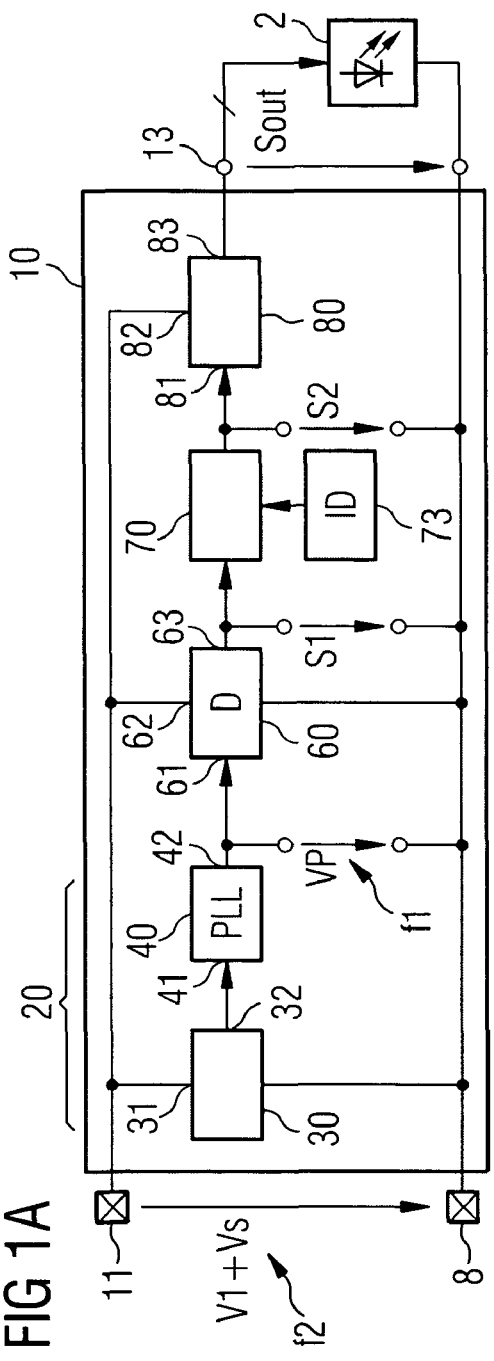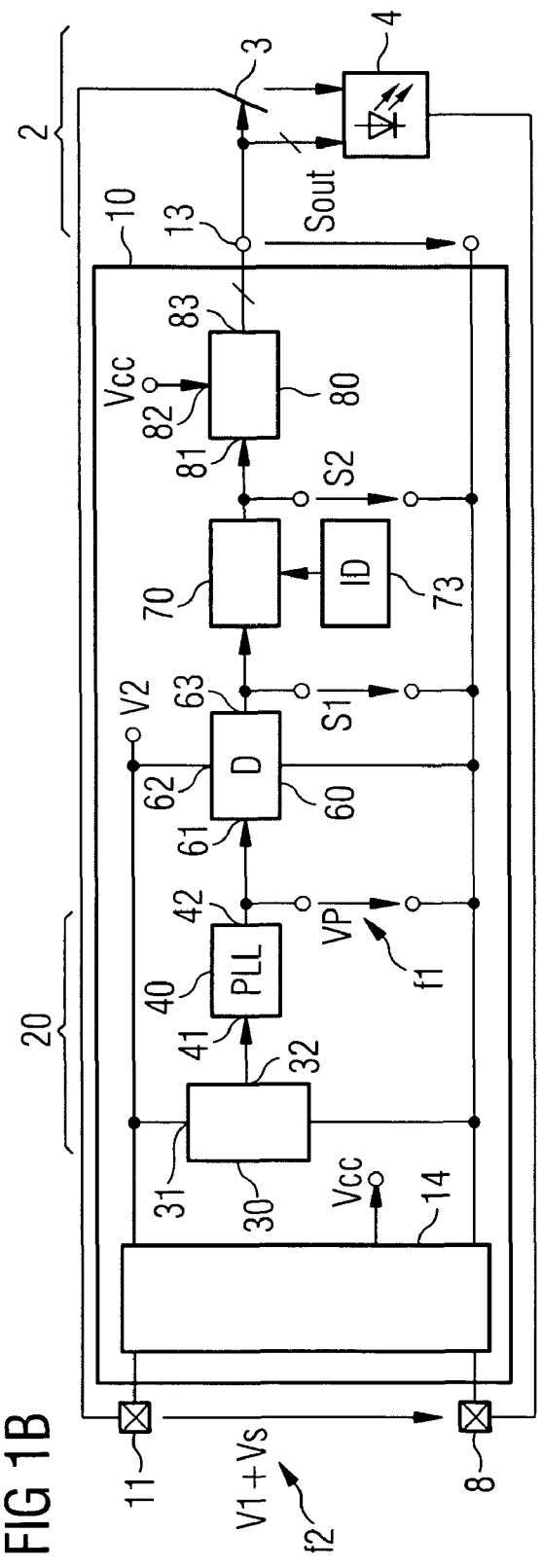
FIG 1A
FIG 1B

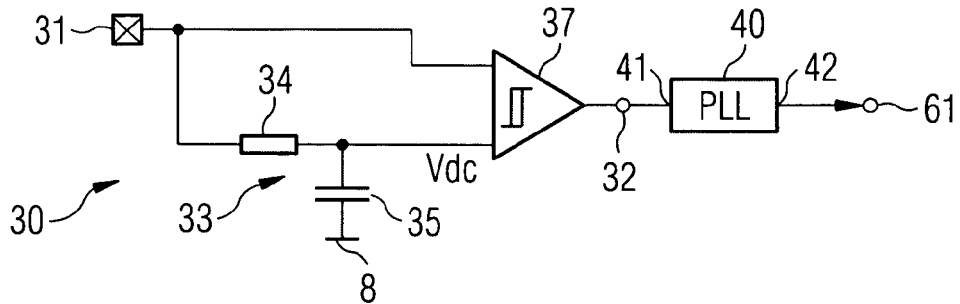
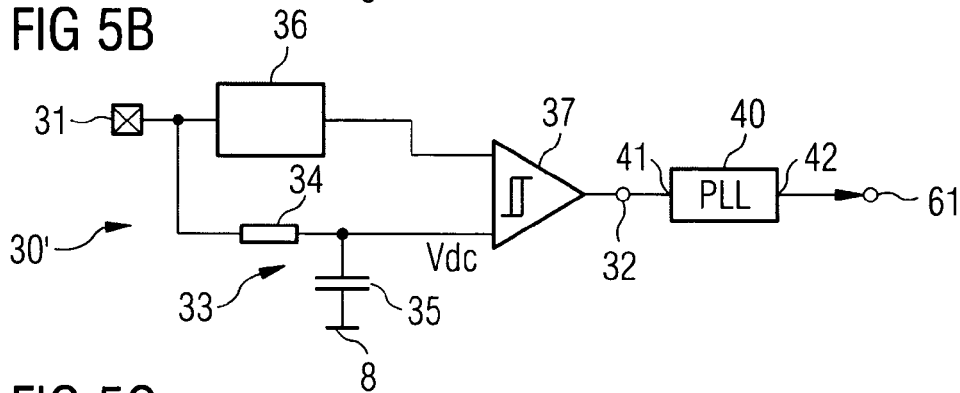
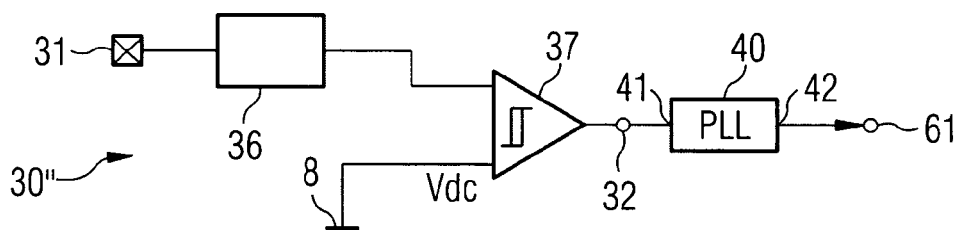
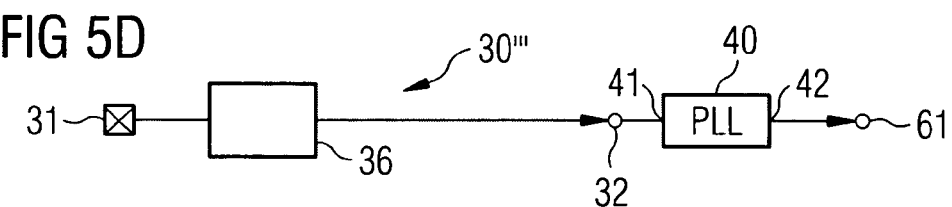
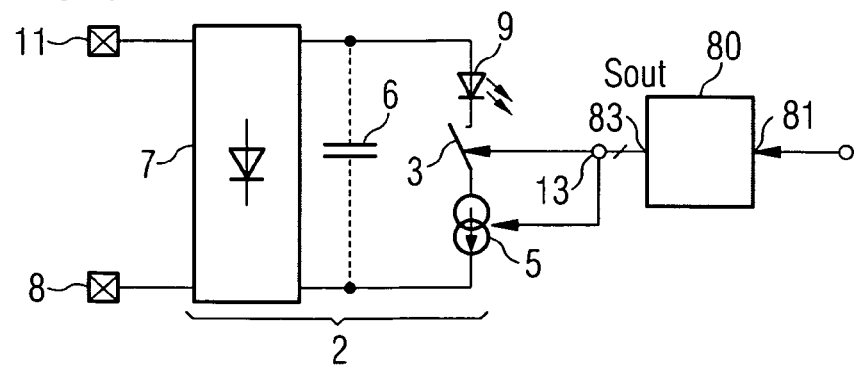

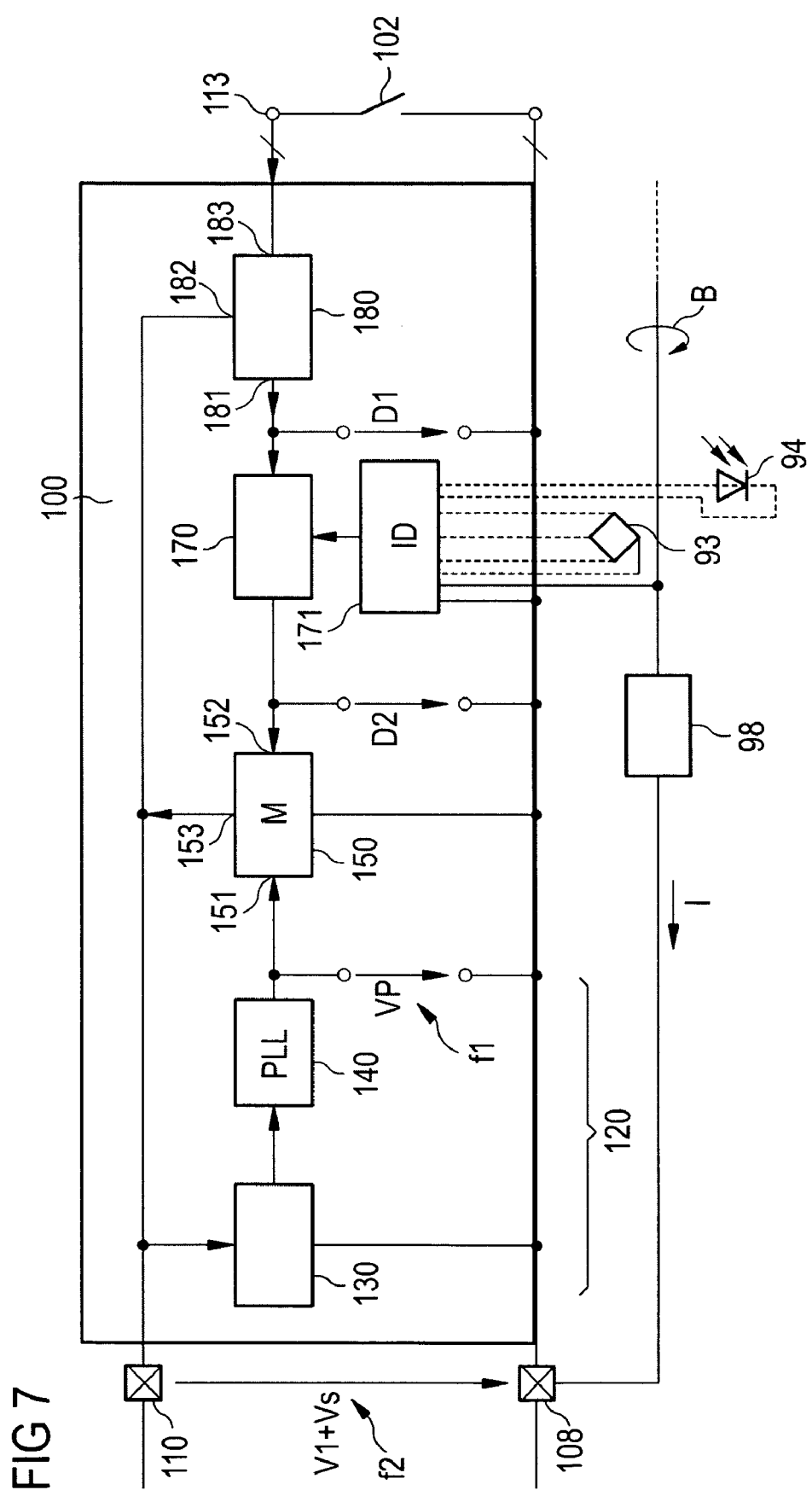

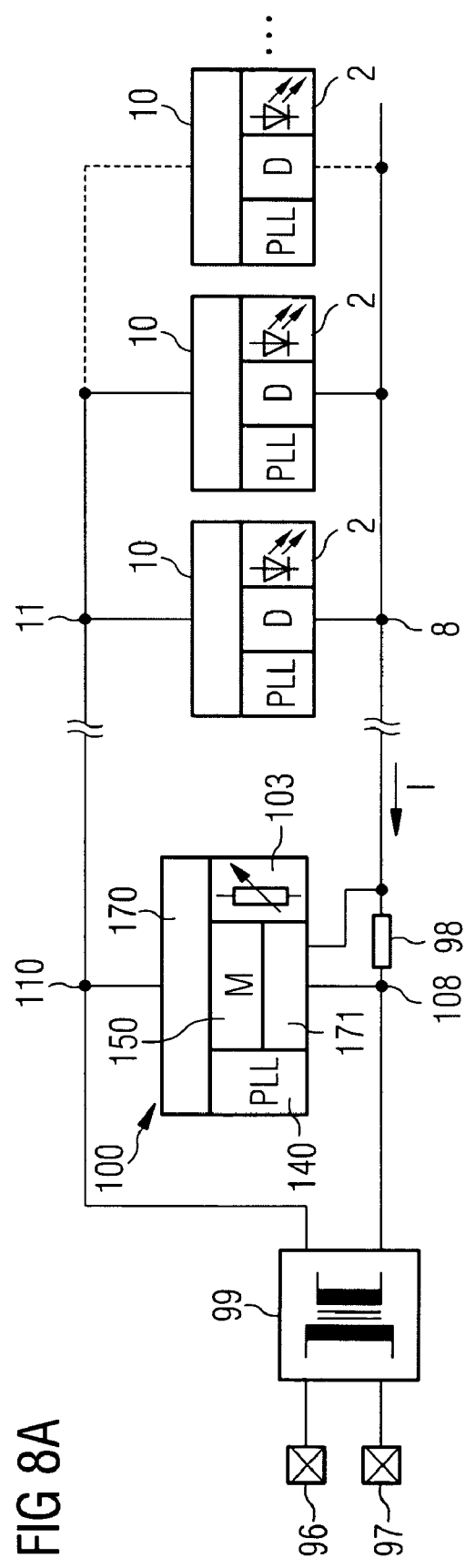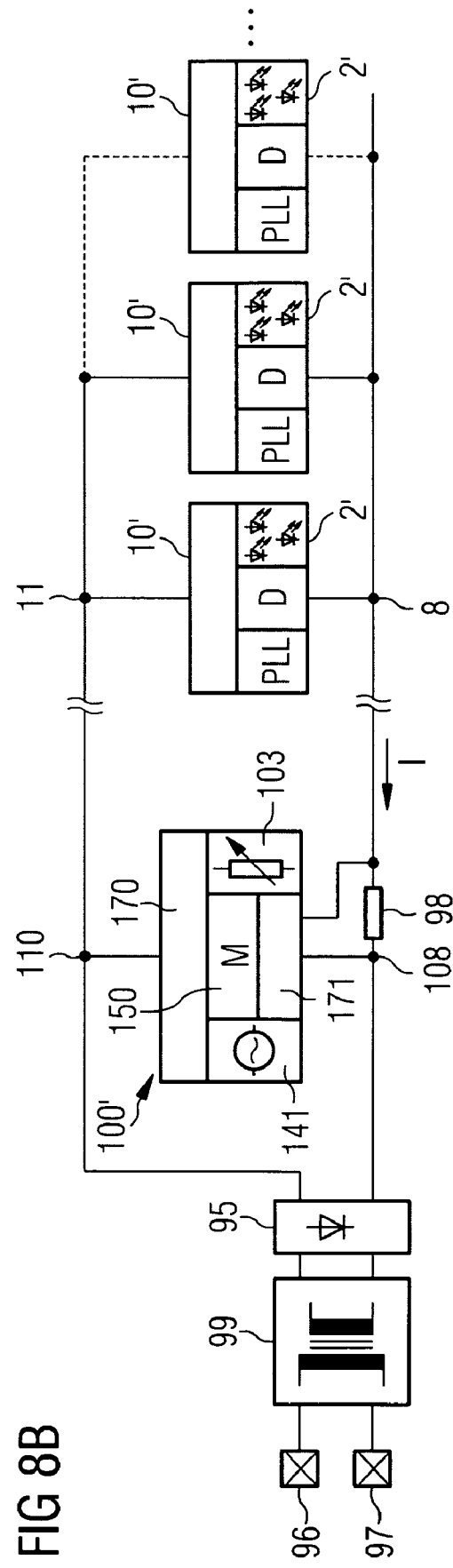

CIRCUIT ARRANGEMENT AND METHOD FOR CONTROLLING AN ELECTRICAL LOAD

RELATED APPLICATIONS

This is a U.S. national stage under 35 USC 371 of application No. PCT/EP2007/000261 filed on 12 Jan. 2007.

This patent application claims the priority of German Patent Application no. 10 2006 001 868.0 filed Jan. 13, 2006 the content of which is hereby incorporated by reference.

FIELD OF THE INVENTION

The present invention relates to a circuit arrangement for driving an electrical load, an energy-supply arrangement, use of the energy-supply arrangement, and a method for driving an electrical load.

BACKGROUND OF THE INVENTION

Energy-supply arrangements can be used not only for supplying energy to an electrical load, but also for controlling electrical loads. In Britain, such arrangements are called Powerline systems, and in the U.S., Carrier-Current systems. Such arrangements can be used for turning lamps on or off and for adjusting lamps. In houses, such an energy-supply arrangement can be provided for the intelligent support of an automation system.

SUMMARY OF THE INVENTION

One object of the present invention is to provide a circuit arrangement for driving an electrical load, an energy-supply arrangement, and a method for driving an electrical load, which can be realized economically.

One aspect of the invention is directed to a circuit arrangement for driving an electrical load which comprises an input, an output, a frequency processing circuit, and a demodulator. The frequency processing circuit is coupled on the input side to the input of the circuit arrangement. On the output side, the frequency processing circuit is connected to a first input of the demodulator. A second input of the demodulator is coupled to the input of the circuit arrangement, and an output of the demodulator is coupled to the output of the circuit arrangement.

The input of the circuit arrangement is used for feeding a power-supply voltage with an AC component. The frequency processing circuit is designed to provide a reference frequency as a function of the AC component. At the first input, the reference frequency is fed to the demodulator. A signal applied to the second input of the demodulator is demodulated by means of the reference frequency. On the output of the demodulator, a first control signal is provided. The output signal provided on the output of the circuit arrangement is used for driving an electrical load that can be coupled thereto.

One advantage of the circuit arrangement is that the reference frequency is provided by using the AC component of the power-supply voltage. Advantageously, a quartz oscillator is not used. Thus, the circuit arrangement can be realized economically and with small surface-area requirements.

In one embodiment, the circuit arrangement is designed for a power-supply voltage that is configured as an AC voltage. The AC voltage is a data signal superimposed on a carrier frequency. The reference frequency corresponds approximately to the value of the carrier frequency.

In an alternative embodiment, the circuit arrangement is designed for a power-supply voltage that is configured as a DC voltage. The DC voltage is a data signal superimposed on a carrier frequency. In the alternative embodiment, the reference frequency can also correspond approximately to the value of the carrier frequency.

The frequency processing circuit can comprise a phase-locked loop, abbreviated PLL. The phase-locked loop can be coupled on the input side to the input of the circuit arrangement and on the output side to the first input of the demodulator. On the output side, the reference frequency is provided to the phase-locked loop.

In one embodiment, the phase-locked loop comprises a phase detector, an amplifier, and a tracking oscillator. The phase detector is coupled at a first input to the input of the phase-locked loop and on the output side via the amplifier and the tracking oscillator to a second input of the phase detector. On the output side, an oscillator signal with the reference frequency is provided to the tracking oscillator. One advantage of the phase-locked loop is that the reference frequency can be provided with the aid of the AC component of the power-supply voltage.

In one refinement, the phase-locked loop comprises a first counter, which is designed for frequency division. It can be connected between the tracking oscillator and the second input of the phase detector. One advantage of the phase-locked loop with a first counter is that a value of the reference frequency can equal a multiple of a value of a frequency of the AC component of the power-supply voltage.

In one embodiment, the tracking oscillator comprises a capacitor and an inductor and is configured as an LC oscillator.

In one alternative embodiment, the tracking oscillator comprises a resistor and a capacitor and is thus configured as an RC oscillator.

In one embodiment, the frequency processing circuit can comprise a filter device, which is coupled on the input side to the input of the circuit arrangement, and on the output side to the first input of the demodulator.

In a first embodiment, the frequency processing circuit comprises the filter device and has no phase-locked loop. In a second embodiment, the frequency processing circuit comprises the phase-locked loop and has no filter device connected between the input of the circuit arrangement and the input of the phase-locked loop. In a third and preferred embodiment, the frequency processing circuit comprises the filter device and the phase-locked loop, wherein the filter device is connected between the input of the circuit arrangement and the input of the phase-locked loop. One advantage of the third embodiment is that, with the filter arrangement, undesired noise can be kept away from the phase-locked loop, and by means of the phase-locked loop, the reference frequency can be generated with a value that is higher than a value of a frequency of the power-supply voltage.

In one embodiment, the output signal is designed for supplying energy to the connectable electrical load. In one alternative embodiment, the output signal is designed in such a way that it can be used as a control signal for controlling the energy supply to the connectable electrical load.

In one refinement, the circuit arrangement has an interpretation circuit. The interpretation circuit can be arranged between the demodulator and the output of the circuit arrangement. The interpretation circuit is used for further processing the first control signal, which is provided on the output side to the demodulator. On the output side, the second control signal can be provided by the interpretation circuit. The interpretation circuit can comprise an error recognition means for recognizing an error in the first control signal fed on the input side to the interpretation circuit. It can also comprise error correction means. The interpretation circuit can be configured for recognizing and correcting an error according to the cyclic-redundancy-check method and for this purpose can have a feedback shift register.

In one refinement, the circuit arrangement has a register for storing an identification code. The identification code can be a binary encoded number. The register can be connected to the interpretation circuit. The interpretation circuit can have a first comparison means for comparing the first control signal and the identification code. The second control signal is provided by the interpretation circuit corresponding to a comparison result of the first comparison means.

In one refinement, the interpretation circuit has second comparison means, which are used for comparing the first control signal and a command code from a set of command codes. The second control signal is provided by the interpretation circuit according to a comparison result of the second comparison means. A command code from the set of command codes can correspond to the command "turn on" the electrical load. Another command code can correspond to the command "turn off." Another command code can be provided for setting the electrical output fed to the electrical load. The electrical load can comprise several sub-loads. Another command code can be provided, for example, with which the ratio of the electrical energy consumption of the multiple sub-loads relative to each other can be set. This can be used advantageously, for example, for RGB illumination with three light-emitting diodes for setting the color mixture.

The interpretation circuit can be configured as a computational unit, by which means the error recognition, the error correction, and the comparisons can be performed.

In one embodiment, an energy-supply arrangement can be provided, which is designed for the combined supply of electrical energy and control data to an electrical load. In one embodiment, the energy-supply arrangement can have at least one circuit arrangement for driving an electrical load, as described above. Furthermore, the energy-supply arrangement can have an input circuit arrangement, which is provided for feeding the control data and which is coupled to the one or more circuit arrangements. Data is transferred via the coupling from the input circuit arrangement to the one or more circuit arrangements. In one refinement, data can also be transferred from the one or more circuit arrangements to the input circuit arrangement.

The input circuit arrangement can have another phase-locked loop. The additional phase-locked loop advantageously has an approximately identical configuration and an approximately identical dimensioning as the phase-locked loop. Due to the approximately identical dimensioning and the approximately identical configuration, the reference frequency provided by the phase-locked loop has approximately the same value as another reference frequency output by the additional phase-locked loop.

The input circuit arrangement can have a modulator, which is designed for modulating an AC voltage provided by the additional phase-locked loop. An analog modulation method can be used. The modulator can be provided for modulation by means of the frequency-shift-keying method.

The input circuit arrangement can be connected to a switch, a keyboard, or a rotary knob for manual input of the setting values for the energy-supply arrangement. Alternatively or additionally, the input circuit arrangement can be connected via an interface to a computer or a remote control for the input of default values. The computer can be configured as a personal computer, as a personal digital assistant, or as a control computer in a control center. The input circuit arrangement can be coupled alternatively or additionally to an installation bus via the interface. The installation bus can be realized as a European installation bus, abbreviated EIB.

The interface can comprise a plug and at least one wire. Alternatively, the interface can be realized in a wireless way and can be configured as an infrared interface or as a radio receiving device.

The circuit arrangement can be used for driving an electrical load. It can be used for driving several electrical loads, which are realized in a different way or in approximately the same way. An electrical load can have lighting means, such as a halogen light source or a light-emitting diode. An electrical load can also comprise three different light-emitting diodes for realizing red-green-blue illumination, abbreviated RGB illumination.

The energy-supply arrangement can have several circuit arrangements and can therefore be designed for controlling several electrical loads. The energy-supply arrangement can also comprise several input circuit arrangements. Advantageously, an electrical load thus can be controlled by an input circuit arrangement in spatial proximity.

The energy supply can be provided in buildings, such as residential houses, for example. The energy-supply arrangement can be used within a residence. Alternatively, the energy-supply arrangement can also be used in office buildings. Alternatively, the energy-supply arrangement can also be used in motor vehicles. For operating the energy-supply arrangement, advantageously existing wiring or installation networks can be used.

The circuit arrangement can be realized on a semiconductor body. In one alternative embodiment, the semiconductor body can also comprise a voltage converter or voltage regulator. The input circuit arrangement can be realized on another semiconductor body. The additional semiconductor body can have another voltage converter or another voltage regulator in addition to the input circuit arrangement.

According to another aspect of the invention, a method for driving an electrical load includes the following steps: a power-supply voltage is fed to a frequency processing circuit. The power-supply voltage has an AC component. A reference frequency is generated by the frequency processing circuit as a function of the AC component of the power-supply voltage and output on the output side of the frequency processing circuit. The power-supply voltage with the AC component is demodulated by means of a demodulator using the reference frequency, and a demodulated signal is output on the output side as a first control signal. An output signal, which is generated as a function of the first control signal, is provided for driving a connectable electrical load.

It is an advantage of the method that the reference frequency required for the demodulation is generated from the AC component of the power-supply voltage. Thus, expensive components, such as quartz oscillators, for example, can be eliminated.

In one refinement, a method is provided to determine whether a circuit arrangement for driving an electrical load, which has a first identification code, is arranged in an energy-supply arrangement. The method provides the following steps: a first energy consumption value of the energy-supply arrangement is defined. A turn-on command is transmitted to an electrical load with a first identification code from the set of possible identification codes. A second energy consumption value of the energy-supply arrangement is defined. Whether a circuit arrangement with the first identification code is arranged in the energy-supply arrangement is determined and prepared from a comparison of the first value and the second value of the energy consumption. One advantage of the method is that it can be determined by a central unit of the energy-supply arrangement whether a circuit arrangement with a first identification code is installed in the energy-supply arrangement. Advantageously, for this purpose, unidirectional communication is sufficient. The central unit can be an input circuit arrangement that is designed for determining the energy consumption of the energy-supply arrangement.

The change in energy consumption can be detected with current measurement of the current consumed by the energy-supply arrangement. Alternatively, the change can be determined by a voltage measurement, for example, a power-supply voltage.

The electrical load can have lighting means. Therefore, advantageously, the change in energy consumption can be indirectly detected by means of a change in the illumination intensity. For this purpose, the input circuit arrangement can have a photodetector or can be coupled to a photodetector.

In one refinement, the above method is performed with another identification code from the set of possible identification codes. If each of the identification codes from the set of possible identification codes is used, then all of the circuit arrangements that are arranged in the energy-supply arrangement can be determined.

In one refinement, before determining the first energy consumption value of the energy-supply arrangement, a turn-off command is sent to the electrical load with the first identification code. One advantage of this refinement is that the presence of a circuit arrangement can also be determined correctly when the circuit arrangement and the driven electrical load are already in a turned-on operating state before performing the method.

In one refinement, after determining the first energy consumption value of the energy-supply arrangement, a turn-on command is sent to circuit arrangements with identification codes from a subset of the set of possible identification codes. After determining the second energy consumption value of the energy-supply arrangement, from the comparison of the first value and the second energy consumption value, the presence of at least one circuit arrangement or no circuit arrangement with an identification code from the subset can be determined and provided. Thus, advantageously, with a few processing steps it can be determined whether a circuit arrangement that has such an identification code from the subset of identification codes is located in the energy-supply arrangement. By means of this method, if it is determined that no circuit arrangement that has an identification code from this subset is located in the energy-supply arrangement, then with additional processing steps it can be determined whether a circuit arrangement that has an identification code from another subset is used in the energy-supply arrangement. By means of this process, if it is determined that at least one circuit arrangement with an identification code from the subset is arranged in the energy-supply arrangement, then the subset can again be divided into subsets and the method continues until an identification code of a circuit arrangement used in the energy-supply arrangement, or several identification codes of several circuit arrangements, are determined. One advantage of this method is that it can be performed in an effective and time-saving manner.

The method for determining identification codes of circuit arrangements that are used in the energy-supply arrangement and the mentioned refinements can generally be used in energy-supply arrangements and independently of the embodiment of the circuit arrangement with the frequency processing circuit and demodulator.

According to one embodiment of the invention, a method is provided for preparing information on the presence of a circuit arrangement for driving an electrical load with a first identification code, wherein the circuit arrangement is comprised by an energy-supply arrangement and connected to the electrical load. The method comprises the following steps:

determining a first energy consumption value of the energy-supply arrangement, sending a turn-on command with a first identification code from a set of possible identification codes to the circuit arrangement, determining a second energy consumption value of the energy-supply arrangement, providing the information on the presence of a circuit arrangement with the first identification code as a function of a comparison of the first and second energy consumption values.

Advantageously, the identification codes of circuit arrangements can be determined through the provision of the information of the presence of a circuit arrangement with an identification code.

With the presence of the circuit arrangement, it is designated that the circuit arrangement is included by the energy-supply arrangement. The present circuit arrangement is integrated into the energy-supply arrangement. The circuit arrangement here draws energy from the energy-supply arrangement. For this purpose, the circuit arrangement is in an active operating state. The electrical load driven by the circuit arrangement can also draw electrical energy from the energy-supply arrangement, if the circuit arrangement has received a turn-on command with the first identification code.

The first and second energy consumption values can be detected by means of a current measurement of the current consumed by the energy-supply arrangement. Alternatively, the first and second energy consumption values can be determined by a voltage measurement, for example, of a power-supply voltage. A change in the energy consumption can be determined by means of the current measurement or the voltage measurement.

The electrical load can have a lighting means. Therefore, advantageously, the first value and the second values and thus the change in the energy consumption can be detected indirectly by means of a change in the lighting intensity. For this purpose, the input circuit arrangement can have a photodetector or can be coupled to a photodetector.

In one refinement, before determining the first energy consumption value of the energy-supply arrangement, a turn-off command with the first identification code is sent to the circuit arrangement. One advantage of this refinement is that the presence of a circuit arrangement can then also be determined correctly when the circuit arrangement and the electrical load driven by it are already in a turned-on operating state before the method is executed.

In one refinement, the information of the presence of at least one additional circuit arrangement for driving at least one additional electrical load with at least one additional identification code is provided, wherein the one or more additional circuit arrangements are included by the energy-supply arrangement. The one or more additional circuit arrangements can be connected to the one or more additional electrical loads. For this purpose, at least one additional first energy consumption value of the energy-supply arrangement can be determined. A turn-on command can be sent with at least one additional identification code from a set of possible identification codes to the circuit arrangement and the one or more additional circuit arrangements. At least one additional second energy consumption value of the energy-supply arrangement can be determined. The information on the presence of a circuit arrangement with the one or more additional identification codes can be provided as a function of a comparison of the one or more additional first energy consumption values and the one or more additional second energy consumption values.

Thus, advantageously, the method with an additional identification code from the set of possible identification codes can be performed. If each of the identification codes from the set of possible identification codes is used, then all of the circuit arrangements, which are arranged in the energy-supply arrangement, can be determined.

In one refinement, after determining the first energy consumption value of the energy-supply arrangement, a turn-on command is sent to circuit arrangements with identification codes from a subset of the set of possible identification codes. After determining the second energy consumption value of the energy-supply arrangement, from the comparison of the first and second energy consumption values, the information of the presence of at least one circuit arrangement or no circuit arrangement with an identification code from the subset can be determined and provided. Thus, advantageously, it can be determined with few processing steps whether a circuit arrangement that has such an identification code from the subset of identification codes is located in the energy-supply arrangement.

By means of this method, if it is determined that no circuit arrangement with an identification code from this subset is located in the energy-supply arrangement, then with additional processing steps, it can be determined whether a circuit arrangement with an identification code from an additional subset is used in the energy-supply arrangement.

By means of this method, if it is determined that at least one circuit arrangement with an identification code from the subset is arranged in the energy-supply arrangement, then the subset can again be divided into subdivided sub-subsets, and the method continues until an identification code of a circuit arrangement used in the energy-supply arrangement is determined or several identification codes of several circuit arrangements are determined. One advantage of this method is that it can be performed in an effective and time-saving manner.

According to the invention, in one embodiment, an energy-supply arrangement comprises a circuit arrangement for driving an electrical load, which is connected to the electrical load and which has a first identification code. The energy-supply arrangement can comprise an input circuit arrangement. This can be designed for determining the energy consumption of the energy-supply arrangement or alternatively can be coupled to a unit for determining the energy consumption of the energy-supply arrangement.

Advantageously, the input circuit arrangement can automatically determine the identification codes of circuit arrangements connected to the energy-supply arrangement. In an installation phase of the energy-supply arrangement, advantageously, the identification code of each individual installed circuit arrangement need not necessarily be provided by means of an interface from outside of the input circuit arrangement.

The input circuit arrangement is preferably coupled to the circuit arrangement.

The input circuit arrangement can be designed to determine a first energy consumption value of the energy-supply arrangement, to send a turn-on command with a first identification code from a set of possible identification codes to the circuit arrangement, to determine a second energy consumption value of the energy-supply arrangement, and to provide the information on the presence of a circuit arrangement with the first identification code as a function of a comparison of the first and second energy consumption values.

Advantageously, unidirectional communication between the input circuit arrangement and the circuit arrangement is sufficient, which is directed from the input circuit arrangement to the circuit arrangement.

In one embodiment, the circuit arrangement is designed as a receiver of data from the input circuit arrangement and not as a transmitter of data to the input circuit arrangement. The circuit arrangement thus can be realized as a passive communications partner.

The energy-supply arrangement can comprise at least one additional circuit arrangement with at least one additional identification code, which is provided for driving at least one additional electrical load.

BRIEF DESCRIPTION OF THE DRAWINGS

Several embodiments of the invention will be explained in more detail below with reference to the figures. Components that are identical in terms of function or action are designated by identical reference symbols. Insofar as circuit parts or components correspond in function, their description will not be repeated in each of the following figures.

FIGS. 1A and 1B show embodiment examples of a circuit arrangement for driving an electrical load, FIGS. 5A-5D show embodiment examples of a filter device, FIG. 6 shows an embodiment example of an electrical load, FIG. 7 shows an embodiment example of an input circuit arrangement, and FIGS. 8A and 8B show embodiment examples of an energy-supply arrangement.

DETAILED DESCRIPTION OF THE DRAWINGS

Figure 2:
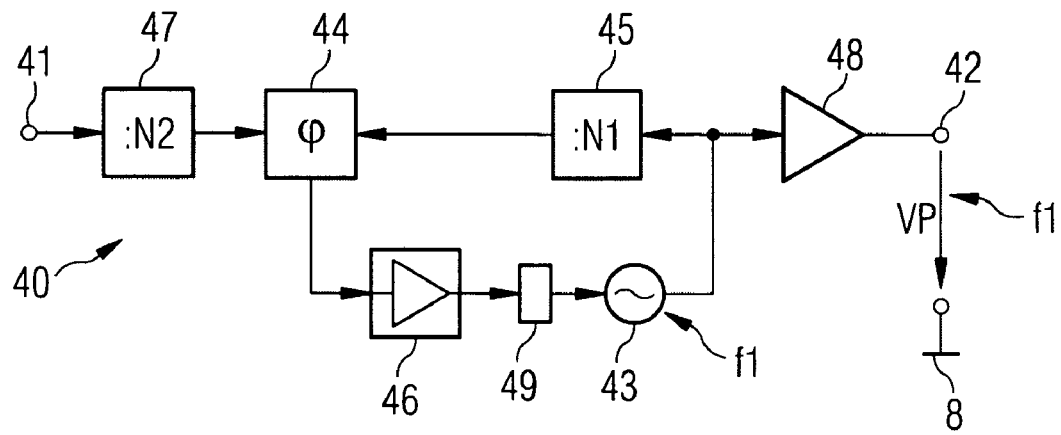
FIG. 2 shows an embodiment example of a phase-locked loop.

FIG. 1A shows an embodiment example of a circuit arrangement for driving an electrical load. The circuit arrangement 10 comprises a frequency processing circuit 20 with a filter device 30 and a phase-locked loop 40, a demodulator 60, an interpretation circuit 70, a driver circuit 80, and also an input 11, a reference potential terminal 8, and an output 13. An electrical load 2 is connected between the output 13 and the reference potential terminal 8. The electrical load 2 can comprise a light-emitting diode.

The filter device 30 is connected via an input 31 to the input 11 of the circuit arrangement 10. The filter device 30 is connected at an output 32 to an input 41 of the phase-locked loop 40. The phase-locked loop 40 is connected at an output 42 to a first input 61 of the demodulator 60. A second input 62 of the demodulator 60 is coupled to the input 11 of the circuit arrangement 10. An output 63 of the demodulator 60 is connected to the interpretation circuit 70. The interpretation circuit 70 is connected on the output side to a first input 81 of the driver circuit 80. A second input 82 of the drive circuit 80 is coupled to the input 11 of the circuit arrangement 10. One output 83 of the drive circuit 80 is connected to the output 13 of the circuit arrangement 10. The filter device 30 and the demodulator 60 are connected to the reference potential terminal 8.

A power-supply voltage Vs and a data signal V1 are fed to the circuit arrangement 10 at the input 11. The data signal V1 has a carrier frequency f2. On the output side, a first AC voltage VP, which comprises a reference frequency f1, can be tapped at the phase-locked loop 40 and thus at the frequency processing circuit 20. The first AC voltage VP is generated by means of the frequency processing circuit 20 from the signal applied to the input 11 of the circuit arrangement 10, that is, the sum from the power-supply voltage Vs and the data signal V1. The demodulator 60 is designed to provide, on the output side, the first control signal S1 by means of the reference frequency f1 and the signal that is applied to the input 11 of the circuit arrangement 10. On the output side, a second control signal S2, which is determined from the first control signal S1, is provided at the outpost side of the interpretation circuit 70. At the output 83 of the driver circuit, and thus at the output 13 of the circuit arrangement 10, an output signal Sout can be tapped. The electrical load 2 is operated with the output signal Sout.

Advantageously, in this way, a data signal V1 can be delivered without expensive components and can be used for controlling the flow of energy to the electrical load 2. Advantageously, in one embodiment, the supply of energy to the electrical load can be set by means of a pulse width-modulated, a linear, or a pulse density-modulated output signal Sout.

In one alternative embodiment, the circuit arrangement 10 comprises a register 73. The register 73 is connected on the output side to an input of the interpretation circuit 70. A second control signal S2, which is determined from the first control signal S1 as a function of the information in the register 73, is provided at the output side of the interpretation circuit 70. Advantageously, one or more circuit arrangements can be selectively addressed and data or a command can be transmitted to it.

In one embodiment, the power-supply voltage Vs can be a DC voltage and the data signal V1 can have a carrier frequency f2. With the frequency processing circuit 20, the reference frequency f1 can be generated with a value that is approximately the value of the carrier frequency f2.

In one alternative embodiment, the power-supply voltage Vs can be an AC voltage with a power line frequency fn of 50 Hz, and the data signal V1 can have a carrier frequency f2 of 10 kHz. With the frequency processing circuit 20, the reference frequency f1 can be generated with a value that is two-hundred times the value of the power line frequency fn and thus corresponds approximately to the value of the carrier frequency f2.

Alternatively, for example, the power line frequency can equal 60 Hz and the carrier frequency can equal 12 kHz.

FIG. 1B shows an alternative embodiment of a circuit arrangement 10. In contrast to the circuit arrangement according to FIG. 1A, in the circuit arrangement 10 according to FIG. 1B, a voltage converter 14 is provided that is connected on the input side to the input 11 of the circuit arrangement 10 and to the reference potential terminal 8. On the output side, the voltage converter 14 is connected to the input 31 of the filter device 30 and to the second input 62 of the demodulator 60 for feeding a second AC voltage V2 to the filter device 30 and to the demodulator 60. The second AC voltage V2 is generated by the voltage converter 14 from the AC component of the power-supply voltage Vs and the data signals V1. In addition, on the output side, an internal power-supply voltage Vcc can be tapped at the voltage converter 14. The internal power-supply voltage Vcc is output by the voltage converter as a DC voltage and is used for powering the analog and digital circuit parts of the circuit arrangement 10. For reasons of clarity, the feeding of the internal power-supply voltage Vcc is shown only for the second input 82 of the driver circuit 80.

In contrast to FIG. 1A, the electrical load 2 in FIG. 1B comprises a switch 3 and a light-emitting diode circuit 4, which are connected between the input 11 and the reference potential terminal 8. The output 13 of the circuit arrangement 10 is configured as a bus output and is used for sending the output signal Sout to a control input of the switch 3 and a control input of the light-emitting diode switch 4.

One advantage of the embodiment of the circuit arrangement 10 with the voltage converter 14 is that the frequency processing circuit 20, the demodulator 60, the interpretation circuit 70, and the driver circuit 80 are only supplied voltages that can be processed on a semiconductor body at their level. The energy needed by the electrical load 2 flows via the input 11 of the circuit arrangement 10 to the output 13 of the circuit arrangement 10 for the electrical load 2, and thus, advantageously, not via the circuit arrangement 10. Advantageously, a circuit arrangement 10 according to FIG. 1B can be used for a power-supply voltage Vs, such as 230 V for example.

Advantageously, by means of the control signal Sout, turning the electrical load on and off using the switch 3 and a fine adjustment of the electrical load, such as light-emitting diode circuit 4 shown, can be realized. Another advantage of the circuit arrangement 10 according to FIG. 1B is that only one or more control signals are provided on the output 13 of the circuit arrangement 10, so that voltages that are higher than the voltages that can be processed on a semiconductor body can be fed to the electrical load 2.

In one embodiment, the power-supply voltage Vs is a power line voltage of 230 V, for example, and the power line frequency equals, for example, 50 Hz. The data signal V1 has, in this embodiment, a carrier frequency f2 with a value of 100 kHz. The voltage converter 14 can here comprise a rectifier. By means of the frequency processing circuit 20, a reference frequency f1 can be generated with a value of 100 kHz from the power line frequency fn of 50 Hz.

In an alternative embodiment, the power-supply voltage Vs can be a DC voltage. The data signal V1 can have a carrier frequency f2 of 10 kHz, for example. The frequency processing circuit 20 is used for generating the reference frequency f1 also with a value of approximately 10 kHz. The voltage converter 14 can have a down converter for DC voltages.

FIG. 2 shows an embodiment example of a phase-locked loop 40, as can be used in the circuit arrangement 10 according to FIGS. 1A and 1B. The phase-locked loop 40 comprises a phase detector 44, an amplifier 46, a tracking oscillator 43, a first counter 45, and a buffer 48.

The input 41 of the phase-locked loop 40 is coupled to a first input of the phase detector 44. One output of the phase detector 44 is coupled via the amplifier 46 to the tracking oscillator 43. One output of the tracking oscillator 43 is coupled via the first counter 45 to a second input of the phase detector 44. The output of the tracking oscillator 43 is coupled via the buffer 48 to the output 42 of the phase-locked loop 40.

An oscillator signal at the output of the tracking oscillator 43 has the reference frequency f1. The reference frequency f1 is divided by means of the first counter 45 by a first division factor N1 and fed to the second input of the phase detector 44. The phase detector 44 determines a phase difference between a signal that is applied to the input 41 of the phase-locked loop 40 and a signal that is generated from the oscillator signal through frequency division by the division factor N1. A phase difference is provided on the output side by the phase detector 44 and is amplified by means of the amplifier 46. The amplified signal is provided for controlling the tracking oscillator 43. The first AC signal VP with the reference frequency f1 can be tapped at the output 42 of the phase-locked loop 40.

One advantage of the circuit arrangement is that, for generating the reference frequency f1, the signal applied to the input 41 of the phase-locked loop 40 is used and not the reference signal output by a vibrating quartz oscillator.

Alternatively, the phase-locked loop 40 comprises a filter 49, which is connected between the amplifier 46 and the tracking oscillator 43.

In one alternative embodiment, a second counter 47 can be connected between the input 41 of the phase-locked loop 40 and the first input of the phase detector 44. By means of the second counter 47, the signal applied to the input 41 of the phase-locked loop 40 is divided by a second division factor N2. The value of the reference frequency f1 is thus a frequency value of the signal applied to the input 41 of the phase-locked loop 40, multiplied by the ratio of the first division factor N1 and the second division factor N2.

Figure 3:
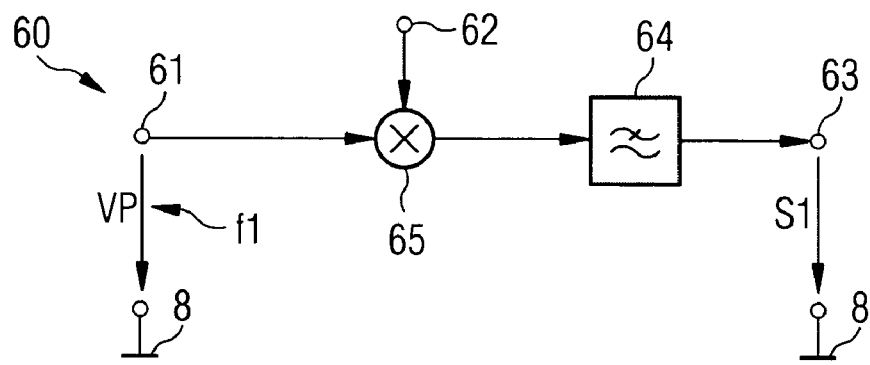
FIG. 3 shows an embodiment example of a demodulator.

FIG. 3 shows an embodiment example of a demodulator 60, as can be used in the circuit arrangement 10 according to FIGS. 1A and 1B. The demodulator 60 has a multiplier 65 and a filter 64. The first input 61 of the demodulator is connected to a first input of the multiplier 65 and the second input 62 of the demodulator is connected to a second input of the multiplier 65. On the output side, the multiplier 65 is coupled via the filter 64 to the output 63 of the demodulator.

The first AC voltage VP, which is required for the demodulation and which has the reference frequency f1, is applied to the first input 61 of the demodulator 60. By means of the reference frequency f1, a signal applied to the second input 62 of the demodulator 60 is demodulated. The multiplier 65 mixes the first AC voltage VP, which has the reference frequency f1, with the signal applied to the second input 62 of the demodulator 60. The signal provided by the multiplier 65 is then filtered by means of the filter 64, so that the first control signal S1 is generated. The filter 64 is configured as a low-pass filter. The first control signal S1 is provided on the output 63 of the demodulator 60. Thus, advantageously, signals with a higher frequency, which are generated during the multiplication process, can be filtered out.

The signal applied to the second input 62 of the demodulator 60 is derived from the signal that comprises the power-supply voltage Vs and the data signal V1. According to the embodiment shown in FIG. 1A, the power-supply voltage Vs and the data signal V1 are supplied to the second input 62 of the demodulator 60. According to the embodiment shown in FIG. 1B, the second AC voltage V2, which is generated from the power-supply voltage Vs and the data signal V1, is supplied to the second input 62 of the demodulator 60.

In one embodiment, the multiplier 65 is realized as a mixer. Preferably, the mixer is configured as a down-conversion mixer.

The mixer can be realized as an additive mixer. The mixer can be a single-phase mixer or a ring mixer, which is also designated as a ring modulator. Preferably, the mixer is configured as a single balanced mixer or as a double balanced mixer, also designated as a Gilbert mixer.

In one undepicted embodiment, the mixer comprises an operational transconductance amplifier. The mixer can be configured as a four-quadrant mixer.

In an undepicted alternative embodiment, the filter 64 is configured as a bandpass filter.

Figure 4:
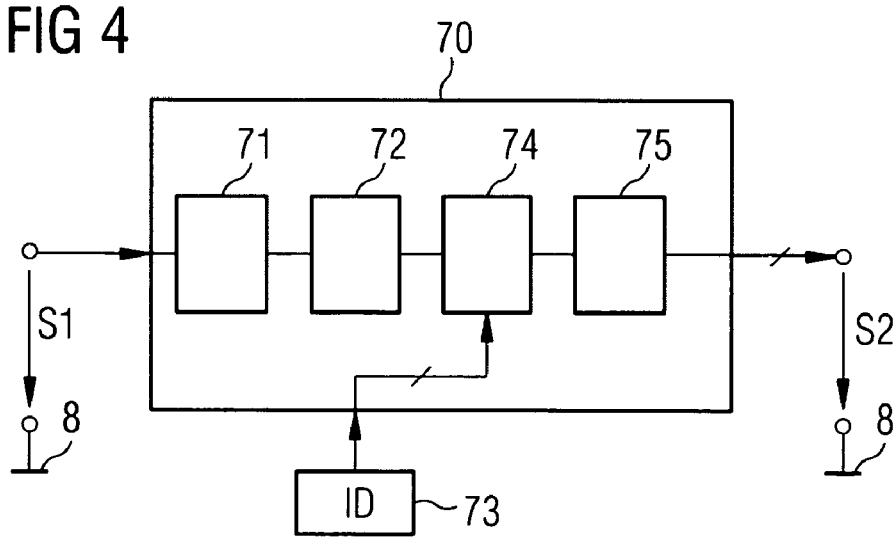
FIG. 4 shows an embodiment example of an interpretation circuit.

FIG. 4 shows an embodiment example of an interpretation circuit 70, as it can be used in the circuit arrangement 10 according to FIGS. 1A and 1B. The interpretation circuit 70 comprises error recognition means 71 and second comparison means 75, which can be arranged in series between an input of the interpretation circuit 70 and an output of the interpretation circuit 70.

The first control signal S1 is fed to the interpretation circuit 70 on the input side. The second control signal S2 can be tapped on the output side of the interpretation circuit 70. The interpretation circuit 70 is provided for recognizing errors in the first control signal S1. The interpretation circuit is designed for comparing the first control signal with a predetermined set of command codes by means of the second comparison means 75, and providing the second control signal S2 according to the identified command code. The output of the interpretation circuit 70 can be configured as a bus output and provided for the output of the second control signal S2 and other control signals.

The interpretation circuit 70 can have, in one embodiment example, a computing circuit for performing error recognition, error correction, identification checking, and command implementation. The computing circuit can comprise a microprocessor. The computing circuit can alternatively comprise a microcontroller.

In one alternative embodiment, the interpretation circuit 70 also comprises error correction means 72 and/or first comparison means 74. The first comparison means 74 are connected via another input of the interpretation circuit 70 to a register 73, which is designed for providing a first identification code ID. The interpretation circuit 70 is provided according to the alternative embodiment for the purpose of not only identifying, but also correcting errors in the first control signal S1. Furthermore, the interpretation circuit 70 is configured for determining, through a comparison of the first control signal according to the error correction and the identification code ID, whether the data in the first control signal is provided for setting this example of the circuit arrangement 10 and thus the second control signal S2.

FIGS. 5A-5D show embodiment examples of a filter device 30, as can be used in the circuit arrangement 10 according to FIGS. 1A and 1B. The output 32 of the filter device 30 can be directly connected to the first input 61 of the demodulator 60. In the alternative embodiments shown in FIGS. 5A-5D, however, the phase-locked loop 40 is connected between the output 32 of the filter device 30 and the first input 61 of the demodulator 60.

FIG. 5A shows an example filter device 30, which comprises a filter 33 and a comparator 37. The filter 33 is configured as a low-pass filter. The filter 33 has a resistor 34 and a capacitor 35, which are connected to each other in series. The input 31 of the filter device 30 is connected to a first input of the comparator 37, and is coupled via the resistor 34 to a second input of the comparator 37. A node between the resistor 34 and the second input of the comparator 37 is coupled via the capacitor 35 to a reference potential terminal 8. One output of the comparator 37 is connected to the output 32 of the filter device 30.

A DC signal, which is applied to the input 31 of the filter device 30, is fed both to the first and also to the second input of the comparator 37 and has approximately no influence on a signal on the output of the comparator 37. Due to the filter 33, an AC signal above a cutoff frequency is led exclusively to the first input of the comparator 37. Thus, as a function of an AC signal on the input 31 of the filter device 30, a digital signal is output to the output 32 of the filter device 30.

FIG. 5B shows another embodiment example of a filter device 30'. The filter device 30' comprises the first filter 33, a second filter 36, and also the comparator 37. The input 31 of the filter device 30 is coupled via the second filter 36 to a first input and via the first filter 33 with a second input of the comparator 37. The first filter 33 configured as a low-pass filter comprises the resistor 34 and the capacitor 35.

FIG. 5C shows another embodiment example of a filter device 30″, which comprises the second filter 36 and the comparator 37. The input 31 of the filter arrangement 30″ is coupled via the second filter 36 to a first input of the comparator 37. A second input of the comparator 37 is connected to the reference potential terminal 8. The filter device 30″ can be used advantageously for signals on the input 31, which comprise no or only a very small DC component.

FIG. 5D shows another embodiment example of a filter device 30‴, comprising the second filter 36. The input 31 of the filter device 30‴ is coupled via the second filter 36 to the output 32 of the filter device 30‴. Advantageously, an analog signal, which comprises an AC component, is provided on the output 32 of the filter device 30‴. The output 32 of the filter device 30‴ can be connected either directly or via the phase-locked loop 40 to the input 61 of the demodulator 60.

FIG. 6 shows an embodiment example of an electrical load 2, as can be used in the arrangement according to FIG. 1B. The electrical load 2 comprises a light-emitting diode 9, a switch 3, a current source 5, and a voltage converter 7. One input of the voltage converter 7 is connected to the input 11 of the circuit arrangement 10 and also with another input of the voltage converter 7 to the reference potential terminal 8. The light-emitting diode 9, the switch 3, and the current source 5 are connected to each other in series and to two outputs of the voltage converter 7. In FIG. 6, only the driver circuit 80 of the circuit arrangement 10 is shown. The output 83 of the driver circuit 80, which is connected to the output 13 of the circuit arrangement 10, is configured as a bus-compatible output. A control input of the switch 3 and a control input of the current source 5 are connected to the output 13.

The voltage converter 7 is designed for generating a DC voltage from the power-supply voltage applied on the input side. The output signal Sout can be tapped at the output 83 of the driver circuit 80. By means of the switch 3, the light-emitting diode 9 can be turned on or off. The current flowing through the light-emitting diode 9 and thus the light intensity of the light-emitting diode 9 is set by the driver circuit 80 through the control of the current source 5.

In one alternative embodiment, the electrical load comprises a capacitor 6 for smoothing the voltage provided by the voltage converter 7.

In one alternative embodiment, the circuit arrangement 10 similarly comprises the voltage converter 7 and/or the switch 3 and/or the current source 5.

FIG. 7 shows an embodiment example of the input circuit arrangement 100. The input circuit arrangement 100 comprises another frequency processing circuit 120, a modulator 150, a computational unit 170, and an input circuit 180. The additional frequency processing circuit 120 has an additional filter device 130 and an additional phase-locked loop 140. The input circuit arrangement 100 further has a first and a second terminal 110, 108 and also an input 113.

Between the input 113 of the input circuit arrangement 100 and the second terminal 108, an additional switch 102 is connected, which can be switched by a user into an open or a closed operating state. The input 113 is connected to a terminal 183 of the input circuit 180. On the output side, the input circuit 180 is connected to the computational unit 170. According to the embodiment shown in FIG. 7, the input 113 can be configured with several lines.

The additional filter device 130 is connected on the input side to the first terminal 110 of the input circuit arrangement 100. On the output side, the additional filter device 130 is connected to an input 141 of the additional phase-locked loop 140. One output 142 of the additional phase-locked loop 140 is connected to a first input 151 of the modulator 150. One output 153 of the modulator 150 is coupled to the first terminal 110.

The additional frequency processing circuit 120 is provided for generating the first AC voltage VP with the reference frequency f1. The reference frequency f1 is fed to the modulator 150. Information on the state of the additional switch 102 is fed by means of the input circuit 180 to the computational unit 170. Thus, on the output side, a first input signal D1 can be tapped on the input circuit 180 and a second input signal D2 can be tapped on the output side of the computational unit 170. The second input signal D2 is supplied to the modulator 150. The modulator 150 is designed to output a data signal V1 on its output 153 by means of the reference frequency f1 and the second input signal D2. Due to the connection of the output 153 of the modulator 150 to the first terminal 110 of the input circuit arrangement 100, both the power-supply voltage VS and also the first data signal V1 can be tapped at the first terminal 110.

The additional frequency processing circuit 120 can be designed advantageously like the frequency processing circuit 20. Thus, in the input circuit arrangement 100, approximately the same value is provided for the reference frequency f1 as that provided by the frequency processing circuit 20 in the circuit arrangement 10.

In one alternative embodiment, the input circuit arrangement 100 can also have means 171 for determining identification codes, which is connected to the computational unit 170. An additional resistor 98 is connected between the second terminal 108 and terminals 8 of the circuit arrangement 10, which are not shown in FIG. 7. The means for determining identification codes 171 is connected on the input side to a terminal, which lies between the additional resistor 98 and the terminal 8 of the circuit arrangement or additional terminals of additional circuit arrangements, and to the second terminal 108 of the input circuit arrangement 100. On the input side, the voltage drop across the additional resistor 98 is applied to the means 171 for determining identification codes. From the voltage, the energy consumption value and thus the energy consumption of the circuit arrangement 10 or the additional circuit arrangements can be determined.

Alternatively, the energy consumption value and thus the change in energy consumption can be determined with a Hall sensor 93, which is arranged in the magnetic field B of a line leading the current I consumed by the energy-supply arrangement. The input circuit arrangement 100 can be coupled to the Hall sensor 93 or alternatively can comprise the Hall sensor 93.

The electrical load can have a lighting means. Therefore, in one alternative embodiment, the change in energy consumption can be detected indirectly via a change in the lighting intensity. For this purpose, the input circuit arrangement 100 can have a photodetector 94 or can be coupled to a photodetector 94. The photodetector 94 can be configured as a photodiode or photoresistor. The photodetector 94 is designed for detecting a value of the lighting intensity. The lighting intensity is an indirect measure of the energy consumption.

In one alternative embodiment, instead of or in addition to the additional switch 102, a keypad, a rotary signal transmitter, or an interface to a personal computer or a remote control or an installation bus can be provided.

FIG. 8A shows an embodiment example of an energy-supply arrangement comprising the input circuit arrangement 100 and two circuit arrangements 10. The input circuit arrangement 100 can be configured according to the input circuit arrangement 100 according to FIG. 7. The two circuit arrangements 10 can be configured like the circuit arrangements according to FIGS. 1A and 1B. Therefore, in FIG. 8A, the input circuit arrangement 100 and the circuit arrangements 10 are shown only schematically.

According to the embodiment example shown in FIG. 8A, the electrical loads 2, fow which the energy supply is controlled by the circuit arrangements 10, each comprise a light-emitting diode. The input circuit arrangement 100 has an adjustable resistor 103. The adjustable resistor can be set manually and can be provided for realizing a dimmer switch.

In one alternative embodiment, the energy-supply arrangement according to FIG. 8A has the additional resistor 98. The current I flowing through the circuit arrangements 10 flows via the additional resistor 98. Thus, the energy consumption and primarily a change in the energy consumption of the circuit arrangements 10 can be determined by the means 171 provided in the alternative embodiment for determining the identification code.

In one alternative embodiment, the energy-supply arrangement has another circuit arrangement 10. Additional circuit arrangements can be provided.

In one alternative embodiment, the energy-supply arrangement has a transformer 99, which is connected on the input side to the terminals 96, 97 and on the output side to the terminals 108, 110, 8, 11. The transformer 99 can be designed as an electronic transformer. The transformer 99 can be used advantageously for transforming a power line voltage into a lower voltage.

FIG. 8B shows another embodiment example of an energy-supply arrangement. According to FIG. 8B, the energy-supply arrangement shows, in contrast to the energy-supply arrangement according to FIG. 8A, an electrical load 2' of the circuit arrangements 10', each of which comprises three light-emitting diodes. The input circuit arrangement 100 has an oscillator circuit 141 for generating an AC voltage, which is fed to the modulator 150 after a frequency division or frequency multiplication. The energy-supply arrangement according to FIG. 8B further shows a rectifier circuit 95, which is connected between the transformer 99 and the terminals 108, 110, 8, 11.

Thus, advantageously, a power line voltage applied between the terminals 96, 97 can be converted by means of the transformer 99 into a lower AC voltage and by means of the rectifier circuit 95 into a DC voltage, which represents the power-supply voltage Vs, which can be used for operating the input circuit arrangement 100, the circuit arrangements 10' with the associated electrical loads 2'.

The interpretation circuit 70 can be implemented in a hardware solution. Each of the error recognition means 71, error correction means 72, first comparison means 74, and second comparison means 75 can be implemented as a digital circuit.

The interpretation circuit 70 can be implemented as a microprocessor or a microcontroller, such as the 8051 compatible IP-block that is available from the company austriamicrosystems, or a microcontroller of the PIC family that is available from the company Microchip. An example of this family is PIC10F200, which is an 8 bit microcontroller. Thus, the error recognition means 71, error correction means 72, first comparison means 74, and second comparison means 75 are implemented in software which runs on the microprocessor or microcontroller.

The driver circuit 80 can be implemented as a current sink which is comprised of the device AS3681 available from austriamicrosystems, and drives light emitting diodes.

The additional frequency determining circuit 120 can be implemented as the frequency processing circuit of FIGS. 1A, 1B, 2 and 5A to 5D.

The modulator 150 may comprise a further multiplier. The signals VP and D2 are provided to the further multiplier for multiplication. The modulator 150 may comprise a voltage-controlled load which is arranged between the further multiplier and the input 11. The data signal is put on the power-supply voltage V1 by means of the voltage-controlled load.

The computational unit 170 can be implemented as a microprocessor or microcontroller. For example, devices which can be used for the interpretation circuit 70 can also be used for the computational unit 170.

The means for determining identification code 171 is an interface between an analog signal and the computational unit 170. The means for determining identification code 171 may comprise an analog-to-digital converter which converts the analog signal to a digital signal which is further processed by the computational unit 170. The analog signal may represent the current I. The analog signal can be provided by means of the additional resistor 98 or the hall sensor 93 or the photo detector 94.

The input circuit 180 may comprise a keyscan circuit for one or more additional switches 102. The keyscan circuit can be implemented as the keyscan circuit of the device AS2525 available from austriamicrosystems.

In an embodiment of the invention, the software will use known principles. The method of cyclic redundancy check, CRC, could be used to implement the error recognition means 71. The Hamming code could be used to implement the error correction means 72. The first comparison means 74 could be implemented by a comparison of the first identification code ID, which is stored in the register 73, with the information in the first control signal S1 or in a signal derived from the first control signal S1. The second comparison means 75 could use a simple language to transfer the information in the first control signal S1 or in a signal derived from the first control signal S1 into the second control signal S2.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A circuit arrangement for driving an electrical load, comprising:
   an input for feeding a power-supply voltage with an AC component;
   an output for providing an output signal for driving a connectable electrical load;
   a frequency processing circuit for preparing a reference frequency as a function of the AC component;
   a demodulator, comprising:
   a first input, which is coupled to an output of the frequency processing circuit for supplying the reference frequency;
   a second input, which is coupled to the input of the circuit arrangement;
   an output, which is coupled to the output of the circuit arrangement;
   a multiplier; and
   a filter, wherein the multiplier is coupled on the input side to the first and second inputs of the demodulator, and on the output side, to the output of the demodulator via the filter,
   wherein the frequency processing circuit comprises a phase-locked loop with
   an input, which is coupled to the input of the circuit arrangement, and an output, which is coupled to the first input of the demodulator and at which the reference frequency can be tapped.

2. The circuit arrangement according to claim 1, wherein the power-supply voltage is configured as an AC voltage with a power line frequency, on which a data signal with a carrier frequency is superimposed, wherein the reference frequency (f1) corresponds approximately to the value of the carrier frequency.

3. The circuit arrangement according to claim 1, wherein the power-supply voltage is configured as a DC voltage, on which a data signal with a carrier frequency is superimposed, wherein the reference frequency corresponds approximately to the value of the carrier frequency.

4. The circuit arrangement according to claim 1, wherein the circuit arrangement comprises a driver circuit with
a first input, which is coupled to the output of the demodulator,
a second input, which is coupled to the input of the circuit arrangement, and
an output, which is connected to the output of the circuit arrangement for the output of the output signal (Sout) for supplying energy or for controlling the energy supply of the connectable electrical load as a function of a control signal applied to the first input of the driver circuit.

5. The circuit arrangement according to claim 1 wherein, the circuit arrangement comprises a register, which comprises an identification code and which is connected to the interpretation circuit, wherein the interpretation circuit comprises first comparison means for comparing the first control signal and the identification code and is designed for the output of the second control signal as a function of a comparison result of the first comparison means.

6. The circuit arrangement according to claim 1, wherein the circuit arrangement is designed for driving a connectable electrical load that is configured as an RGB light-emitting diode arrangement.

7. The circuit arrangement according to claim 1, wherein the circuit arrangement comprises at least one additional output for driving at least one additional connectable electrical load.

8. The energy-supply arrangement according to claim 1, wherein the modulator is adapted for modulation according to an analog modulation method.

9. The energy-supply arrangement according to claim 1, wherein the modulator is designed for modulation according to the frequency-shift-keying method.

10. The energy-supply arrangement according to claim 1, wherein
the input circuit arrangement comprises an additional filter device connected upstream of the additional phase-locked loop.

11. The circuit arrangement according to claim 1, wherein the phase-locked loop comprises an amplifier, a tracking oscillator, and a phase detector,
wherein the phase detector is coupled
at a first input to the input of the phase-locked loop and
at an output via the amplifier and the tracking oscillator, at which an oscillator signal with the reference frequency can be tapped on the output side, to a second input of the phase detector.

12. The circuit arrangement according to claim 11, wherein the phase-locked loop comprises a first counter for frequency division, which is connected between the tracking oscillator and the second input of the phase detector.

13. The circuit arrangement according to claim 1, wherein the frequency processing circuit comprises a filter device, which is coupled at an input to the input of the circuit arrangement and which is connected at an output to the input of the phase-locked loop.

14. The circuit arrangement according to claim 13, wherein the filter device comprises a filter and a comparator, wherein the comparator is coupled
at a first input via the filter to the input of the filter device,
at a second input to the input of the filter device or a reference potential terminal and
at an output to the output of the filter device.

15. The circuit arrangement according to claim 1, wherein the circuit arrangement comprises an interpretation circuit, which is connected after the demodulator and which is designed on the output side for the output of a second control signal as a function of a first control signal, which can be tapped at the output of the demodulator.

16. The circuit arrangement according to claim 15, wherein the interpretation circuit comprises second comparison means for comparing the first control signal and a command code from a set of predetermined command codes, and is designed for the output of the second control signal as a function of a comparison result of the second comparison means.

17. The circuit arrangement according to claim 15, wherein the interpretation circuit comprises error recognition means for recognizing an error in the first control signal and error correction means for correcting the error in the first control signal.

18. The circuit arrangement according to claim 17, wherein the error recognition means are designed for error checking according to the Cyclic-redundancy-check method.

19. An energy-supply arrangement for the combined supply of electrical energy and control data to an electrical load, comprising:
at least one circuit arrangement for driving an electrical load according to claim 1, and
an input circuit arrangement for supplying the control data, wherein said input circuit arrangement is coupled to the one or more circuit arrangements for transmitting data.

20. A method for driving an electrical load with the energy-supply arrangement according to claim 19 for driving a lighting means.

21. The energy-supply arrangement according to claim 19, wherein the input circuit arrangement comprises an additional phase-locked loop, and a modulator connected downstream of the phase-locked loop.

22. The energy-supply arrangement according to claim 21, wherein the additional phase-locked loop has an approximately identical configuration and an approximately identical dimensioning as the phase-locked loop.

23. A method for driving an electrical load,
comprising the steps of:
feeding a power-supply voltage with an AC component to a frequency processing circuit;
providing a reference frequency on the output side of the frequency processing circuit as a function of the AC component, wherein the frequency processing circuit comprises a phase-locked loop and the reference frequency is provided on the output side of the phase locked loop;
demodulating the power-supply voltage with the reference frequency and providing a first control signal with a demodulator, in which the power-supply voltage is mixed by means of the reference frequency by a multiplier, and the first control signal is generated by filtering a signal provided by the multiplier; and providing an output signal for driving at least one connectable electrical load as a function of the first control signal.

24. The method according to claim 23, further comprising:

providing the information on the presence of a circuit arrangement for driving an electrical load with a first identification code, wherein the circuit arrangement is comprised of an energy-supply arrangement, and said circuit arrangement comprises the frequency processing circuit and the demodulator wherein said providing the information comprises the steps of:

determining a first energy consumption value of the energy-supply arrangement;

transmitting a turn-on command to the circuit arrangement, which is connected to the electrical load, with a first identification code from a set of possible identification codes;

determining a second energy consumption value of the energy-supply arrangement; and providing the information of the presence of a circuit arrangement with the first identification code as a function of a comparison of the first and second energy consumption values.

25. The method according to claim 24, comprising:

sending a turn-on command with a subset comprising the first identification code and at least one additional identification code from a set of possible identification codes; and providing the information on the presence of at least one circuit arrangement with an identification code from the subset as a function of a comparison of the first and second energy consumption values.

* * * * *